(12) United States Patent
Asame et al.

(10) Patent No.: US 12,140,106 B2
(45) Date of Patent: Nov. 12, 2024

(54) BELT COVER STRUCTURE FOR INTERNAL COMBUSTION ENGINE

(71) Applicant: HONDA MOTOR CO., LTD., Tokyo (JP)

(72) Inventors: Koichiro Asame, Tokyo (JP); Osamu Yoda, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/557,163

(22) PCT Filed: Apr. 25, 2022

(86) PCT No.: PCT/JP2022/018695
§ 371 (c)(1),
(2) Date: Oct. 25, 2023

(87) PCT Pub. No.: WO2022/230801
PCT Pub. Date: Nov. 3, 2022

(65) Prior Publication Data
US 2024/0229735 A1    Jul. 11, 2024

(30) Foreign Application Priority Data
Apr. 30, 2021   (JP) ................................. 2021-078039

(51) Int. Cl.
*F02F 11/00*        (2006.01)
*F01L 1/02*         (2006.01)
(Continued)

(52) U.S. Cl.
CPC ............. *F02F 11/002* (2013.01); *F01L 1/024* (2013.01); *F01P 5/10* (2013.01); *F16M 1/026* (2013.01); *F01L 2250/04* (2013.01)

(58) Field of Classification Search
CPC ........ F02F 11/002; F01L 1/024; F01L 2250/04; F01P 5/10; F16M 1/026
(Continued)

(56) References Cited

FOREIGN PATENT DOCUMENTS

| JP | S57-119160 U | 7/1982 |
|----|--------------|--------|
| JP | 61-6654 U    | 1/1986 |

(Continued)

OTHER PUBLICATIONS

JP-2741078-B2 (Apr. 15, 1998) (Machine Translation) (Year: 1998).*
(Continued)

*Primary Examiner* — Mahmoud Gimie
(74) *Attorney, Agent, or Firm* — Carter, DeLuca & Farrell LLP

(57) ABSTRACT

Provided is a belt cover of an internal combustion engine having ease of attachment and detachment and sealability. A belt cover structure for an internal combustion engine includes an oil pump case OP and a lower cover 9 that cover a timing belt TB, and a side mount bracket 8 that is adjacent to an upper side of the lower cover 9 and is held by a cylinder block CB. Mating surfaces 96c and 86c that are aligned with each other are respectively formed on the lower cover 9 and the side mount bracket 8. A lower seal member 41 is disposed on the mating surface 96c, and the mating surface 86c is configured to cover the mating surface 96c from the outside. The lower cover 9 and the side mount bracket 8 are fixed in a state where the mating surface 86c of the side mount bracket 8 is pressed against the mating surface 96c of the lower cover 9 via the seal member 41.

3 Claims, 9 Drawing Sheets

(51) Int. Cl.
*F01P 5/10* (2006.01)
*F16M 1/026* (2006.01)

(58) Field of Classification Search
USPC .................................................... 123/41.44
See application file for complete search history.

(56) References Cited

FOREIGN PATENT DOCUMENTS

| | | | | |
|---|---|---|---|---|
| JP | 61-179351 U | 11/1986 | | |
| JP | S61-183445 U | 11/1986 | | |
| JP | 2-50050 U | 4/1990 | | |
| JP | 2-105501 U | 8/1990 | | |
| JP | 2741078 B2 * | 4/1998 | .............. | F02B 75/22 |
| JP | 2820765 B2 * | 11/1998 | .............. | F01L 1/024 |

OTHER PUBLICATIONS

JP-2820765-B2 (Nov. 5, 1998) (Year: 1998).*
International Search Report issued in corresponding International Application No. PCT/JP2022/018695, dated Jul. 12, 2022, pp. 1-3, English Translation.

* cited by examiner

BELT COVER STRUCTURE FOR INTERNAL COMBUSTION ENGINE

CROSS-REFERENCE TO RELATED APPLICATION (S)

This is a national stage application filed under 37 U.S.C. 371 based on International Patent Application No. PCT/JP2022/018695, filed Apr. 25, 2022, which claims priority to Japanese Patent Application No. 2021-078039 filed Apr. 30, 2021, the disclosures of which are incorporated herein by reference in their entireties.

TECHNICAL FIELD

The present invention relates to a belt cover structure for an internal combustion engine for protecting a timing belt attached to the internal combustion engine.

BACKGROUND ART

In an internal combustion engine mounted on a vehicle, a timing belt (or a transmission band such as a timing chain) is used to synchronously transmit rotational power of a crankshaft to a camshaft. Here, in order to protect the timing belt from water and dust, a belt cover that covers the timing belt is disposed on a cylinder block of the internal combustion engine. The belt cover needs to be detached from and attached to the cylinder block from time to time for inspection or replacement of the timing belt and the like.

In Patent Literature 1, a timing belt cover includes three members of an upper cover and two lower covers, and these members are attached to an internal combustion engine body. The two lower covers are engaged with each other by a labyrinth structure formed on the respective joint surfaces. With this configuration, one of the lower covers can be detached after the upper cover is detached, and maintenance of an auxiliary machine attached to the cylinder block can be performed with the other lower cover attached.

CITATION LIST

Patent Literature

Patent Literature 1: JP 61-179351 U

SUMMARY OF INVENTION

Technical Problem

Meanwhile, in Patent Literature 1, the two lower covers are assembled in a labyrinth structure. Here, in the case of assembling in a labyrinth structure, assembling in a single direction causes little issue in terms of ease of attachment and detachment. However, if there are many members or the belt cover is three-dimensionally formed, it may become necessary to move the members in multiple directions at the time of attachment and detachment of the members. At this time, an issue may arise in terms of ease of attachment and detachment. The belt cover is also required to have sealability to be waterproof and dustproof, in addition to ease of attachment and detachment.

The present invention has been made to solve the above problems, and an object of the present invention is to provide a belt cover of an internal combustion engine having ease of attachment and detachment and sealability.

Solution to Problem

In order to achieve this object, an invention according to an aspect of this disclosure is a belt cover structure for an internal combustion engine (1) that is disposed on one side surface of an internal combustion engine body (cylinder block CB in embodiments (herein after, the same applies in this section)) and houses at least a part of a timing belt (TB) that transmits power between a crankshaft (10) and a camshaft (11, 12, 13, 14), the belt cover structure including: an inner cover member (oil pump case OP) that covers the timing belt on a side closer to the internal combustion engine than the timing belt; and an outer cover member (lower cover 9) that covers the timing belt on a side farther from the internal combustion engine than the timing belt, the outer cover member including at least a lower outer cover member (lower cover 9) that covers a periphery of the crankshaft, wherein the internal combustion engine body holds a side mount bracket (8) that is disposed adjacent to an upper side of the lower outer cover member, mating surfaces (96c, 86c) that are aligned with each other are respectively formed on the lower outer cover member and the side mount bracket, a lower seal member (41) that seals the lower outer cover member and the side mount bracket is disposed on the mating surface (96c) of the lower outer cover member, the mating surface (86c) of the side mount bracket is configured to cover the mating surface of the lower outer cover member from an outside, and the lower outer cover member and the side mount bracket are fixed in a state where the mating surface of the side mount bracket is pressed against the mating surface of the lower outer cover member via the lower seal member.

As described above, since the mating surface of the side mount bracket is configured to cover the mating surface of the lower outer cover member from the outside, the side mount bracket and the lower outer cover member adjacent to each other in the vertical direction are fixed in a direction intersecting the vertical direction. Accordingly, when the side mount bracket is detached from the lower outer cover member, the side mount bracket can be detached in the direction intersecting the vertical direction. In this case, for example, even when it is difficult to detach the side mount bracket in the upward direction due to another cover disposed above the side mount bracket, the side mount bracket can be easily detached. In addition, the lower outer cover member and the side mount bracket are fixed in a state of being pressed against each other via the lower seal member. Therefore, it is possible to provide a belt cover of an internal combustion engine having ease of attachment and detachment and sealability.

An invention according to an aspect of this disclosure is the belt cover structure for an internal combustion engine, wherein a water pump case (WP) is disposed on the one side surface of the internal combustion engine body, the side mount bracket has an end portion (8a) on one side in a width direction that is a direction perpendicular to an axial direction of the crankshaft, the end portion on the one side being configured to cover the water pump case, and has an end portion (8b) on another side in the width direction, the end portion on the other side being configured to be fixed to an outer surface (37) of the water pump case, and the side mount bracket is configured to be moved to the other side when the side mount bracket is attached and the side mount bracket is configured to be moved to the one side when the side mount bracket is detached.

As described above, in the configuration where the side mount bracket is moved to the one side at the time of detachment and is moved to the other side at the time of attachment, the end portion on the other side of the side mount bracket is fixed to the outer surface of the water pump case. This results in a reduction in the amount of movement in the axial direction of the end portion on the other side of the side mount bracket when the side mount bracket is attached and detached, compared to a case where the end portion on the other side covers the water pump case like the end portion on the one side. Therefore, the ease of attachment and detachment of the side mount bracket can be enhanced.

An invention according to an aspect of this disclosure is a belt cover structure for an internal combustion engine (1) that is disposed on one side surface of an internal combustion engine body (cylinder block CB) and houses at least a part of a timing belt (TB) that transmits power between a crankshaft and a camshaft, the belt cover structure including: an inner cover member (front inner cover 2) that covers the timing belt on a side closer to the internal combustion engine than the timing belt; and an outer cover member (front outer cover 6) that covers the timing belt on a side farther from the internal combustion engine than the timing belt, the inner cover member including at least an upper inner cover member (front inner cover 2) that covers a periphery of the camshaft, the outer cover member including at least an upper outer cover member (front outer cover 6) that covers a periphery of the camshaft, wherein a water pump case (WP) is disposed on the one side surface of the internal combustion engine body so as to be adjacent to a lower side of the upper inner cover member, a side mount bracket (8) that covers the water pump case on a side farther from the internal combustion engine than the water pump case is disposed, the upper outer cover member is fixed to an upper side of the side mount bracket via a first seal member (first upper seal member 51) provided on the side mount bracket, the upper inner cover member is fixed to an upper side of the side mount bracket and an upper side of the water pump case via a second seal member (second upper seal member 52) provided on the side mount bracket, and an end portion (51a) of the first seal member and an end portion (52a) of the second seal member are disposed so as to be in pressure contact with each other.

As described above, the first seal member that forms a seal between the upper outer cover member and the side mount bracket and the second seal member that forms a seal between the upper inner cover member and the side mount bracket are disposed so as to be in pressure contact with each other at their end portions. This makes it possible to ensure sealability between the first seal member and the second seal member. In addition, since the water pump case is configured to be covered by the side mount bracket, at the time of maintenance of the water pump, detaching the side mount bracket allows for the maintenance and thus attachment and detachment are easy. Therefore, it is possible to provide a belt cover of an internal combustion engine having ease of attachment and detachment and sealability.

An invention according to an aspect of this disclosure is the belt cover structure for an internal combustion engine, wherein a bolt boss portion (62) through which a fastening bolt (61) is inserted is formed continuously through the side mount bracket and the water pump case, the side mount bracket has a mating surface (81) that is aligned with both the upper inner cover member and the upper outer cover member near the bolt boss portion, and a step shape (81a) is formed on the mating surface such that the end portion of the first seal member and the end portion of the second seal member are brought into pressure contact with each other by a fastening force of the fastening bolt.

As described above, the step shape is formed on the mating surface of the side mount bracket such that the end portion of the first seal member and the end portion of the second seal member are brought into pressure contact with each other by the fastening force of the fastening bolt. Accordingly, the first seal member and the second seal member are brought into pressure contact with each other by inserting the fastening bolt through the bolt boss portion and tightening it, and therefore sealability can be ensured.

DESCRIPTION OF EMBODIMENTS

Hereinafter, a preferred embodiment of a belt cover structure for an internal combustion engine 1 of the present invention will be described in detail with reference to the drawings. In the present embodiment, a case where the internal combustion engine 1 is vertically installed will be described as an example. Further, a description will be given assuming that an extending direction of a crankshaft 10 and camshafts 11, 12, 13, and 14 of the internal combustion engine 1 is an axial direction, a vertically upward and vertically downward direction is a vertical direction, and a front-rear direction of a vehicle when the internal combustion engine 1 is vertically installed on the vehicle is a front-rear direction.

Figure 1:
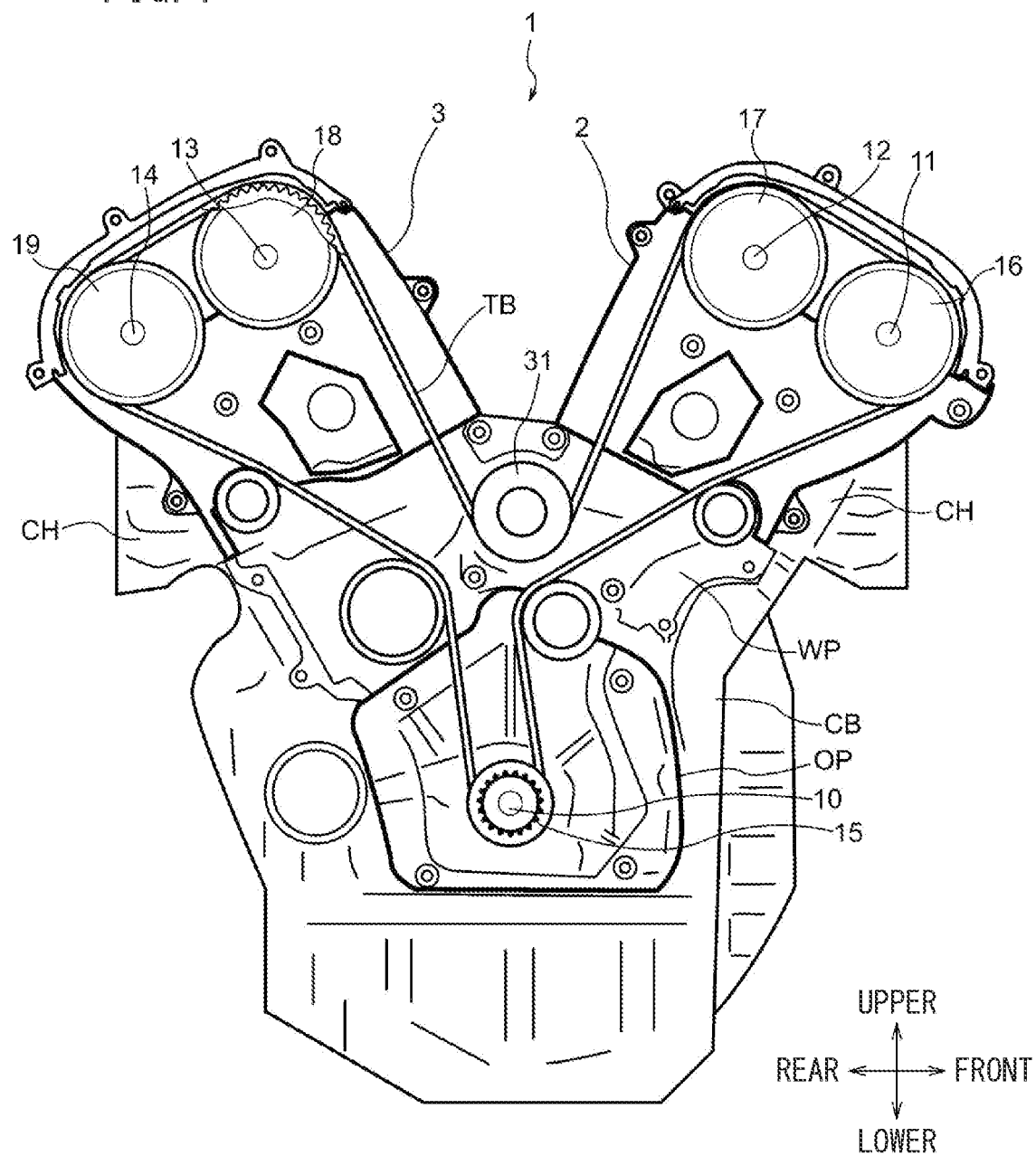
FIG. 1 is a view illustrating a timing belt and a belt cover disposed inside the timing belt in an internal combustion engine.
Figure 2:
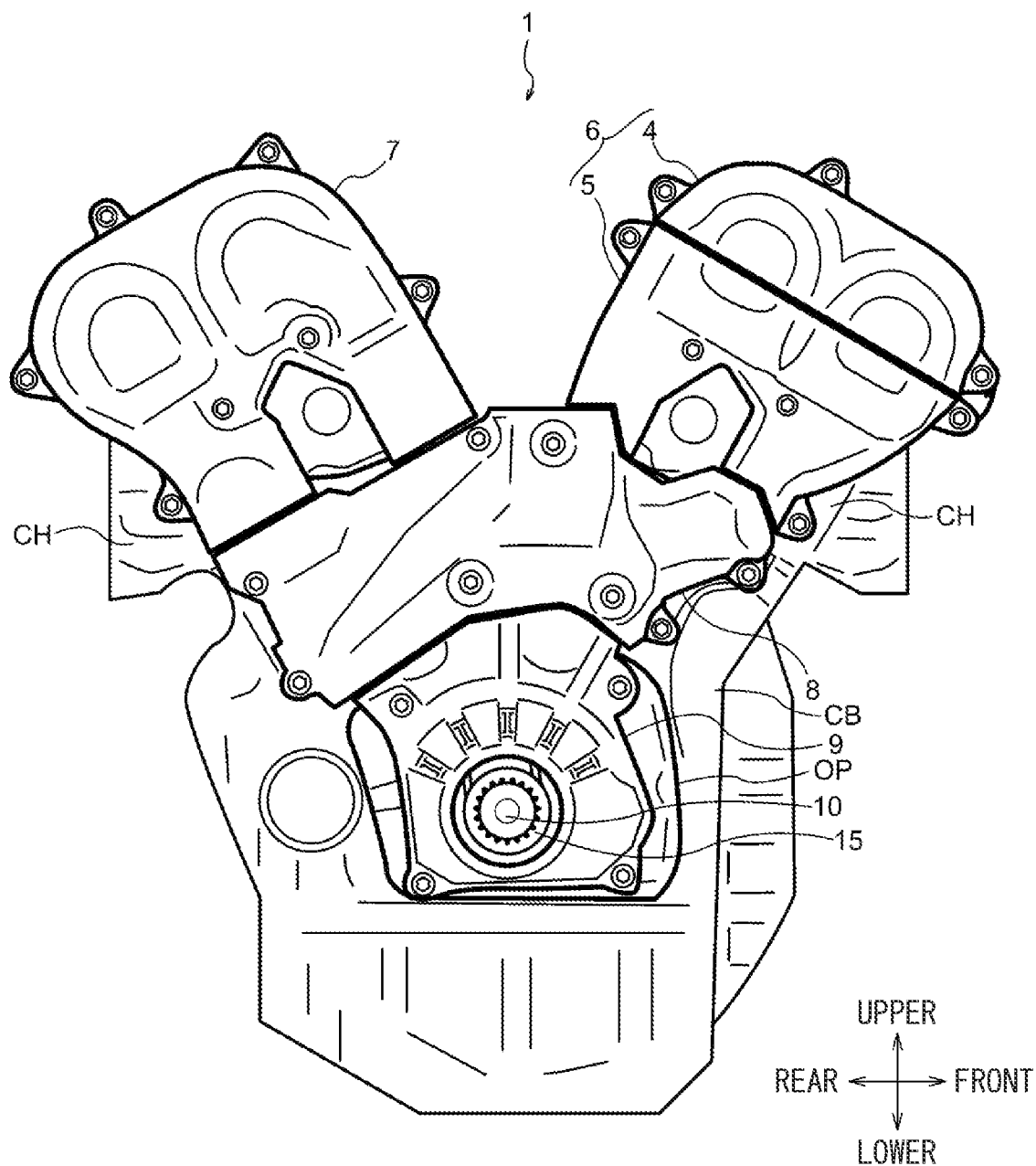
FIG. 2 is a view illustrating the belt cover disposed outside the timing belt in the internal combustion engine.

An outline of a structure of a timing belt TB of the internal combustion engine 1 and a belt cover structure for the internal combustion engine 1 will be described with reference to FIGS. 1 and 2. FIG. 1 is a view illustrating the timing belt TB and a belt cover disposed inside the timing belt TB in the internal combustion engine 1. FIG. 2 is a view illustrating the belt cover disposed outside the timing belt TB in the internal combustion engine 1. Here, regarding inside and outside, with respect to the timing belt TB, a side closer to cylinder heads CH, CH or a cylinder block CB of the internal combustion engine 1 is referred to as inside, and the opposite side thereof is referred to as outside.

As illustrated in FIG. 1, the crankshaft 10 and the camshafts 11, 12, 13, and 14 are disposed so as to project from the cylinder heads CH and CH and the cylinder block CB on one side surface of the internal combustion engine 1. The crankshaft 10 and the camshafts 11, 12, 13, and 14 are linked to drive pulleys 15, 16, 17, 18, and 19, respectively. The timing belt TB is stretched around the drive pulleys 15, 16, 17, 18, and 19 and other pulleys. This causes the crankshaft 10 and the camshafts 11, 12, 13, and 14 to rotate in conjunction with each other.

As illustrated in FIGS. 1 and 2, the timing belt TB is protected by the belt cover. The belt cover is assembled on one side surface of the internal combustion engine body and houses the timing belt TB. The belt cover of the present embodiment includes a front inner cover 2, a rear inner cover 3, an upper outer cover 4, a lower outer cover 5, a rear outer cover 7, a side mount bracket 8, and a lower cover 9. A seal member or the like is disposed between each cover to form a seal between the covers. The arrangement of the seal member or the like to provide a seal between the covers allows the belt cover to house the timing belt TB in a liquid-tight state as a whole.

An assembling procedure of the belt cover of the present embodiment will be described with reference to FIGS. 1 and 2. First, as a premise, as illustrated in FIG. 1, the front inner cover 2 and the rear inner cover 3 are assembled to the cylinder heads CH and CH before the timing belt TB is assembled on the internal combustion engine 1. Further, an oil pump case OP and a water pump case WP are assembled on one side surface of the cylinder block CB.

As illustrated in FIG. 2, the lower cover 9 is attached so as to cover a periphery of the crankshaft 10, and the side mount bracket 8 is attached so as to be adjacent to an upper side of the lower cover 9. Thereafter, the rear outer cover 7 is attached so as to cover outer sides of the drive pulleys 18 and 19 of the camshafts 13 and 14 and to be adjacent to an upper side of the side mount bracket 8. In addition, the lower outer cover 5 is attached so as to be adjacent to an upper side of the side mount bracket 8, and the upper outer cover 4 is attached so as to be adjacent to an upper side of the lower outer cover 5. Here, the upper outer cover 4 and the lower outer cover 5 integrally constitute a front outer cover 6 that covers outer sides of the drive pulleys 16 and 17 of the camshafts 11 and 12. The front outer cover 6 is disposed in front of the rear outer cover 7.

Figure 3:
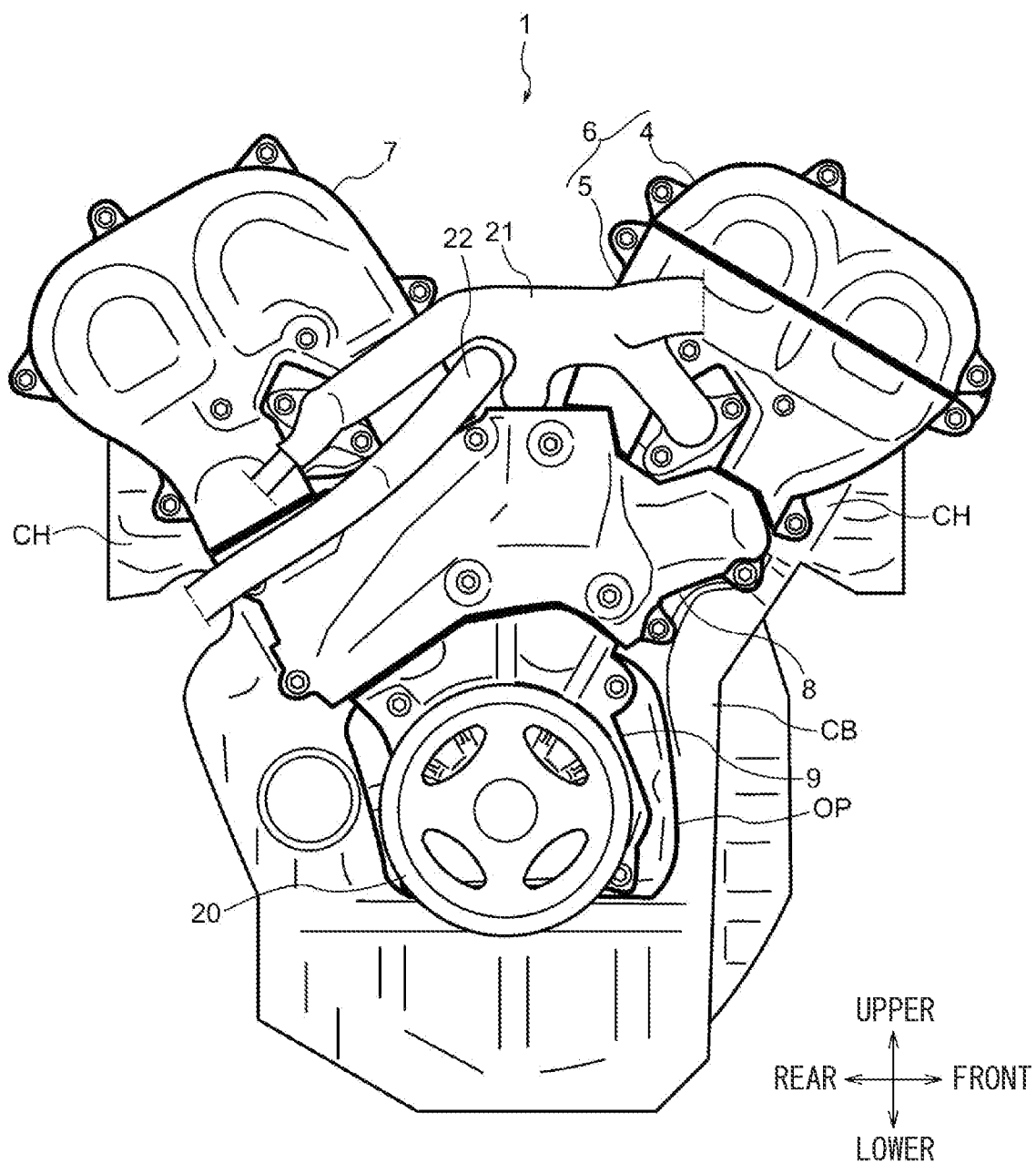
FIG. 3 is a side view of the internal combustion engine illustrating a state in which the belt cover is assembled.

FIG. 3 is a side view of the internal combustion engine 1 illustrating a state in which the belt cover is assembled. As illustrated in FIG. 3, in the state where the belt cover is assembled, a crank pulley 20 is connected to the crankshaft 10, a pipe 21 is disposed outside the front outer cover 6 and the rear outer cover 7, and a pipe 22 is disposed outside the side mount bracket 8.

Figure 4:
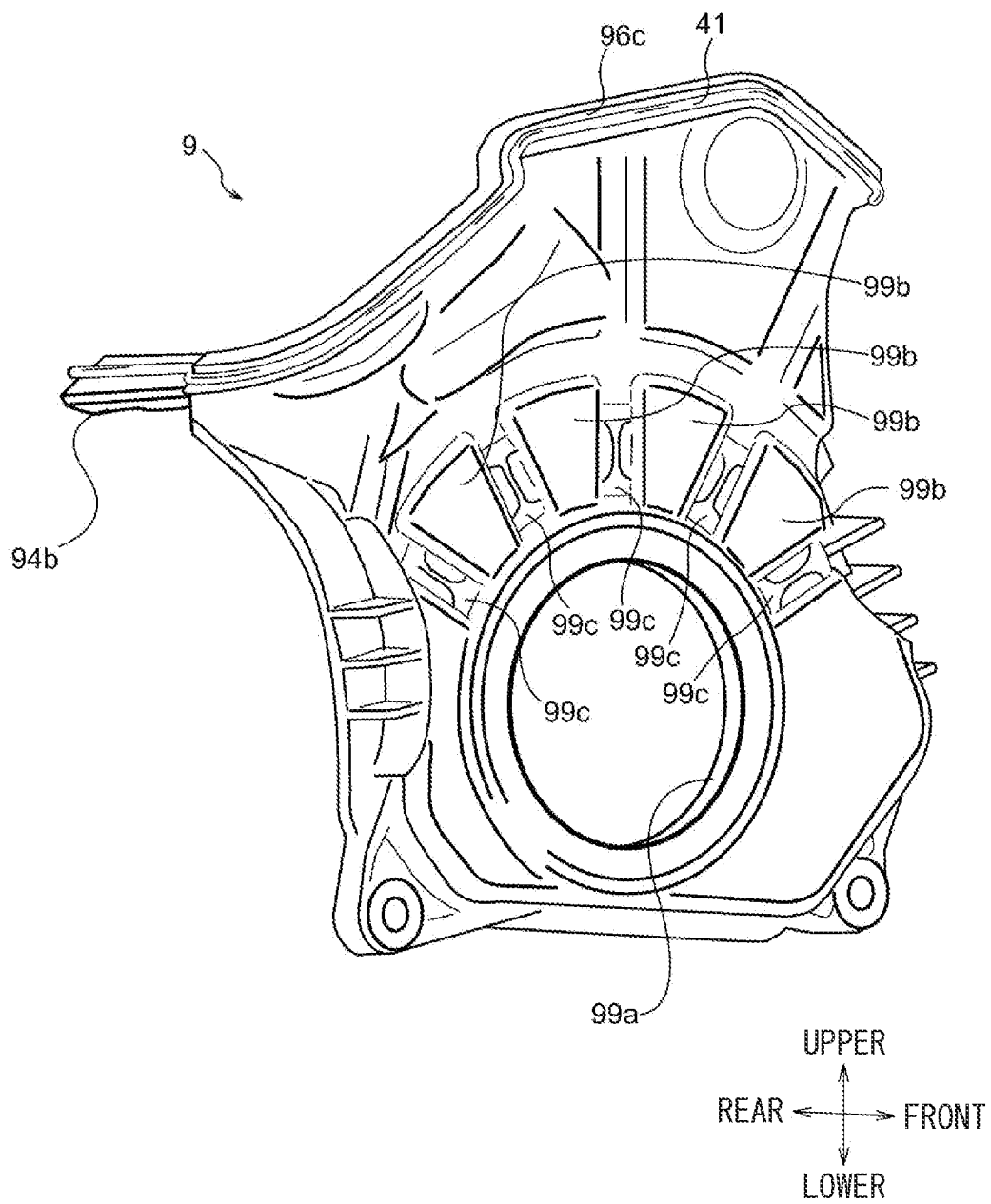
FIG. 4 is a perspective view of a lower cover as viewed from the outside.
Figure 5:
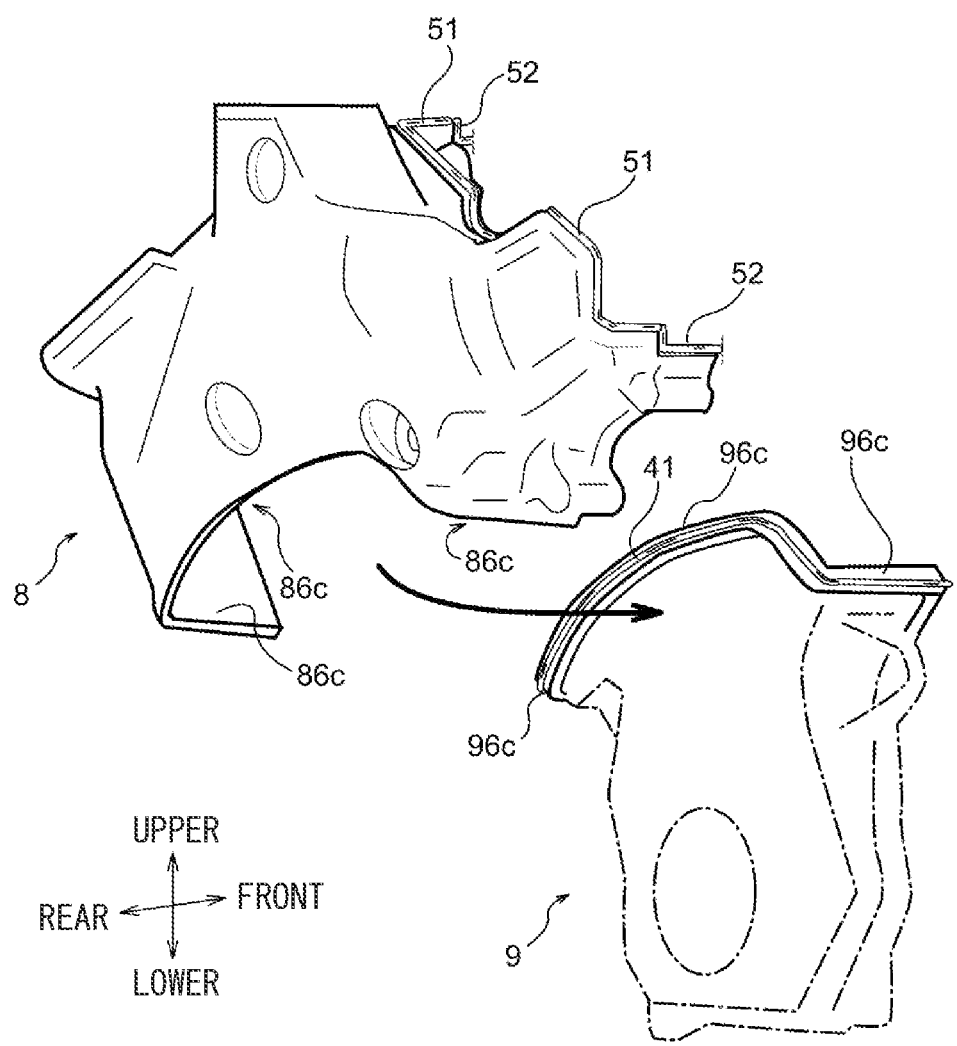
FIG. 5 is a perspective view illustrating a state in which a side mount bracket is assembled on the lower cover.

Next, assembly of the side mount bracket 8 and the lower cover 9 in the belt cover structure for the internal combustion engine 1 of the present embodiment will be described. FIG. 4 is a perspective view of the lower cover 9 as viewed from the outside. FIG. 5 is a perspective view illustrating a state in which the side mount bracket 8 is assembled on the lower cover 9.

As illustrated in FIG. 4, a mating surface 96*c* for the side mount bracket 8 is formed on an outer peripheral surface of an upper end of the lower cover 9 so as to surround the oil pump case OP. A lower seal member 41 that seals the lower cover 9 and the side mount bracket 8 is disposed on the mating surface 96*c*. In addition, an upper end portion of a side wall of the lower cover 9 has a projecting portion 94*b* projecting toward the internal combustion engine 1.

A plurality of vibration suppressing ribs is disposed on an outer surface of the lower cover 9 in order to increase rigidity of the lower cover 9 and to suppress vibration of the lower cover 9. On the outer surface of the lower cover 9, four first protruded ribs 99*b* having a fan shape are formed radially around an opening 99*a* for the crankshaft 10. Further, on the outer surface of the lower cover 9, five second protruded ribs 99*c* having an I shape are arranged so as to be adjacent to the first protruded ribs 99*b* in the circumferential direction. The protruded height of the second protruded ribs 99*c* is lower than the protruded height of the first protruded ribs 99*b*. The second protruded ribs 99*c* provided between the first protruded ribs 99*b* increase the rigidity of the lower cover 9, suppress surface vibration of the lower cover 9 due to driving of the crankshaft 10 and the timing belt TB, and suppress vibration of the mating surface 96*c*. Therefore, it is possible to maintain the sealability of the mating surface 96*c* without additionally tightening a fastening bolt or the like and also to reduce deterioration of the lower seal member 41 due to the vibration. Note that the number of the ribs is not limited to the number of the ribs of the present embodiment.

As illustrated in FIG. 5, on the outer peripheral surface of the upper end of the lower cover 9, the mating surface 96*c* of the lower cover 9 is formed so as to surround the oil pump case OP in directions intersecting the vertical direction (the axial direction away from the internal combustion engine 1 and the front-rear direction). The mating surface 96*c* of the lower cover 9 is aligned to the side mount bracket 8. A lower seal member 41 that seals the lower cover 9 and the side mount bracket 8 is disposed on the mating surface 96*c*. The lower seal member 41 is fitted in a depressed groove formed in the mating surface 96*c* of the lower cover 9.

The side mount bracket 8 is adjacent to the upper side of the lower cover 9 and is held by the cylinder block CB. A mating surface 86*c* of the side mount bracket 8 that is aligned with the mating surface 96*c* of the lower cover 9 is formed on the side mount bracket 8. The mating surface 86*c* of the side mount bracket 8 is formed on an inner surface of a lower end of the side mount bracket 8. The mating surface 86*c* of the side mount bracket 8 is configured to cover the mating surface 96*c* of the lower cover 9 from the outside. Note that a groove in which a first upper seal member 51 and a part of a second upper seal member 52 are disposed is formed at an upper end of the side mount bracket 8. The first upper seal member 51 and the second upper seal member 52 will be described later.

With this configuration, when the side mount bracket 8 is assembled on the lower cover 9, they are fixed in a state where the mating surface 86*c* of the side mount bracket 8 is pressed against the mating surface 96*c* of the lower cover 9 via the lower seal member 41. This fixation is performed with a fastening member such as a fastening bolt not illustrated. The lower seal member 41 is including an elastic member. In this manner, the side mount bracket 8 is pressed in the axial direction against the lower cover 9 to be fixed thereto, and covers the lower cover 9 from the axial direction and the right-left direction in the figure (front-rear direction) intersecting the axial direction.

Figure 6:
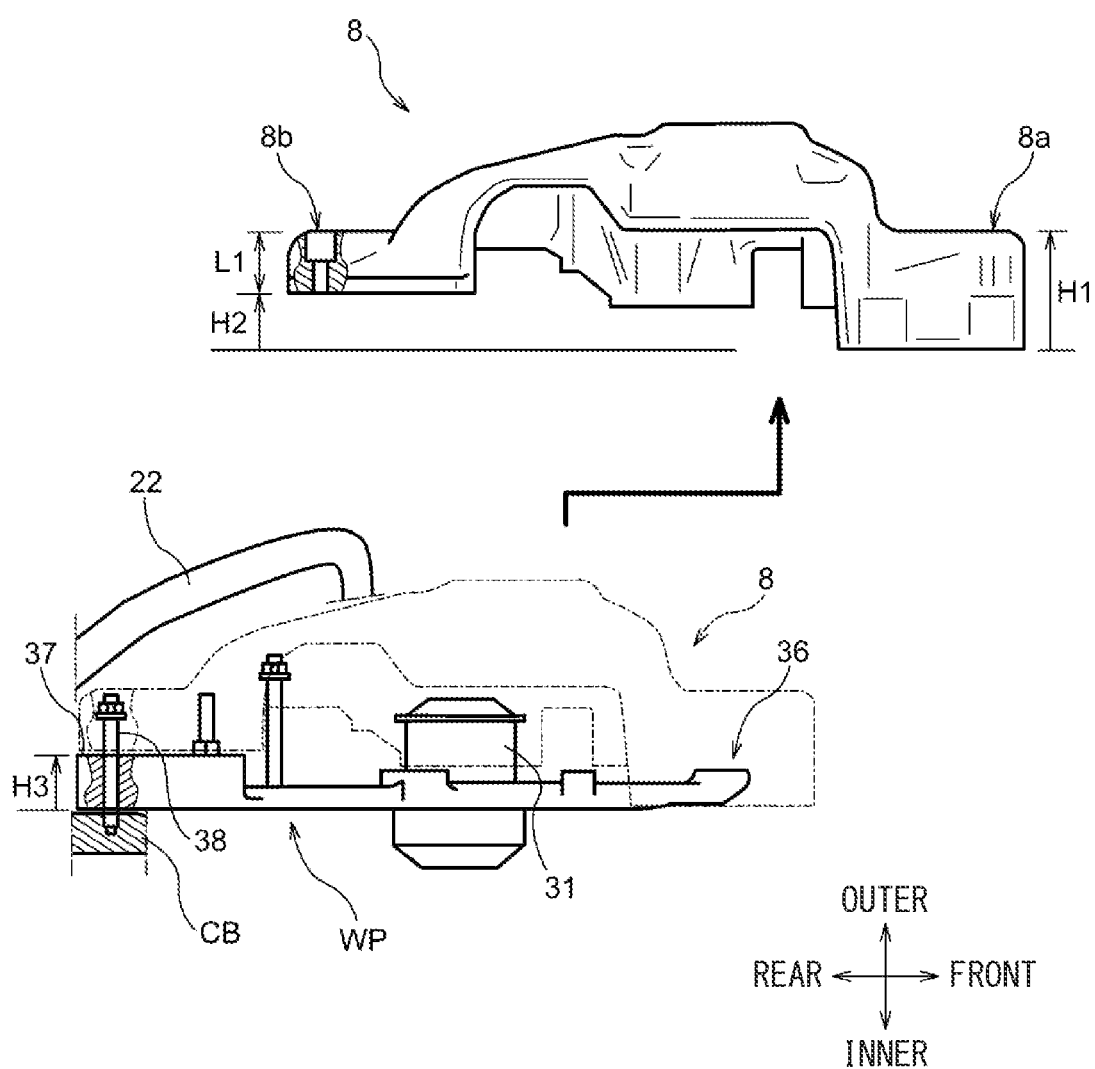
FIG. 6 is a view from below illustrating a state in which the side mount bracket is detached from a water pump case.

FIG. 6 illustrates a relationship between the side mount bracket 8 and the water pump case WP. FIG. 6 is a view from below illustrating a state in which the side mount bracket is detached from the water pump case. The water pump case WP includes a drive pulley 31 that drives the water pump.

The side mount bracket 8 has an end portion 8*a* on one side (front side) in a width direction of the side mount bracket 8 (front-rear direction) that is a direction perpendicular to the axial direction of the crankshaft 10 such that the end portion 8*a* covers the water pump case WP. In addition, the side mount bracket 8 has an end portion 8*b* on the other side (rear side) in the width direction such that the end portion 8b is fixed to an outer surface 37 of the water pump case WP. In the present embodiment, the side mount bracket 8 and the water pump case WP are tightly fixed by inserting a fastening bolt 38 into a bolt boss portion from the side mount bracket 8 through the water pump case WP to the cylinder block CB. Note that the fixing method is not limited thereto.

The side mount bracket 8 is moved in the front-rear direction when attached to and detached from the water pump case WP. Specifically, when the side mount bracket 8 is attached to the water pump case WP, the side mount bracket 8 is moved from the front to the rear and then fixed to the water pump case WP. On the other hand, when the side mount bracket 8 is detached from the water pump case WP, the side mount bracket 8 is unfastened and then moved from the rear to the front.

A difference in height (length from an inner end portion of the end portion 8a) in the axial direction of the side mount bracket 8 will be described. The height H1 of the front end portion 8a of the side mount bracket 8 is configured such that front and outer sides of a front end portion 36 of the water pump case WP is covered. Meanwhile, the height H2 of the rear end portion 8b of the side mount bracket 8 is configured to be equal to the height H3 of the rear outer surface 37 of the water pump case WP.

As described above, the rear end portion 8b of the side mount bracket 8 is tightly fixed to the rear outer surface 37 of the water pump case WP. Thus, the length L1 in the axial direction of the rear end portion 8b of the side mount bracket 8 can be shortened by increasing the height H3 of the rear outer surface 37 of the water pump case WP. Here, the pipe 22 is disposed outside the side mount bracket 8 from the upper side to the rear side of the side mount bracket 8 (see FIG. 3). Therefore, the shorter length L1 in the axial direction can further improve the ease of attachment and detachment of the side mount bracket 8 because it is possible to reduce the amount of movement of the side mount bracket 8 in the axial direction at the time of attachment and detachment.

Figure 7:
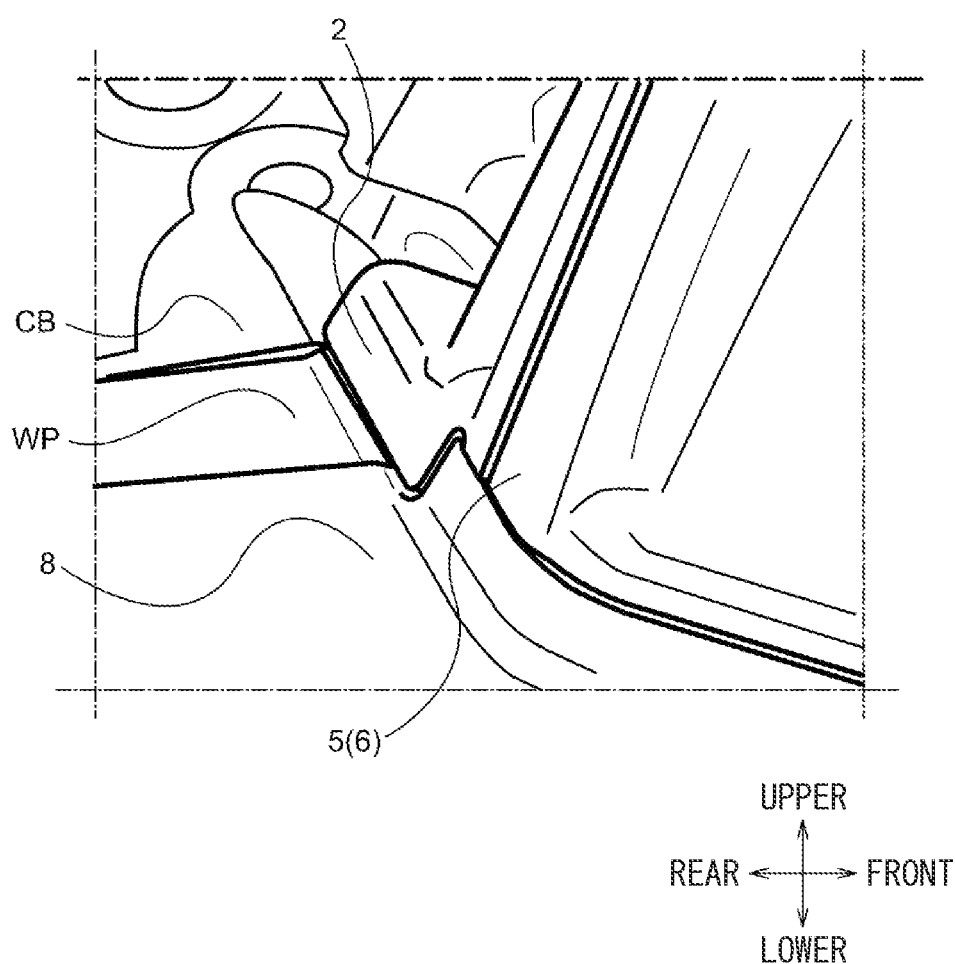
FIG. 7 is a perspective view for explaining an assembling configuration of the side mount bracket to upper members.

An assembling configuration on the upper side of the side mount bracket 8 will be described with reference to FIG. 7. FIG. 7 is a perspective view for explaining the assembling configuration of the side mount bracket 8 to upper members. Hereinafter, only the assembling configuration of the side mount bracket 8 and a front part such as the front outer cover 6 will be described in detail. Note that the assembling configuration of the side mount bracket 8 and a rear part such as the rear outer cover 7 and the rear inner cover 3 is similar in relation to the side mount bracket 8, the water pump case WP, and the cylinder block CB.

The front inner cover 2 that covers the timing belt TB on a side closer to the internal combustion engine 1 than the timing belt TB and the front outer cover 6 that covers the timing belt TB on a side farther from the internal combustion engine 1 than the timing belt TB are disposed above the side mount bracket 8. In the present embodiment, the side mount bracket 8 is fixed to the lower outer cover 5 of the front outer cover 6.

The front inner cover 2 covers inner sides of the camshafts 11 and 12 and the drive pulleys 16 and 17. The front outer cover 6 covers peripheries of the camshafts 11 and 12 and the drive pulleys 16 and 17. The water pump case WP is disposed on one side surface in the axial direction of the cylinder block CB so as to be adjacent to a lower side of the front inner cover 2. The side mount bracket 8 is disposed so as to cover the water pump case WP on a side (outer side) farther from the internal combustion engine 1 than the water pump case WP.

Figure 8:
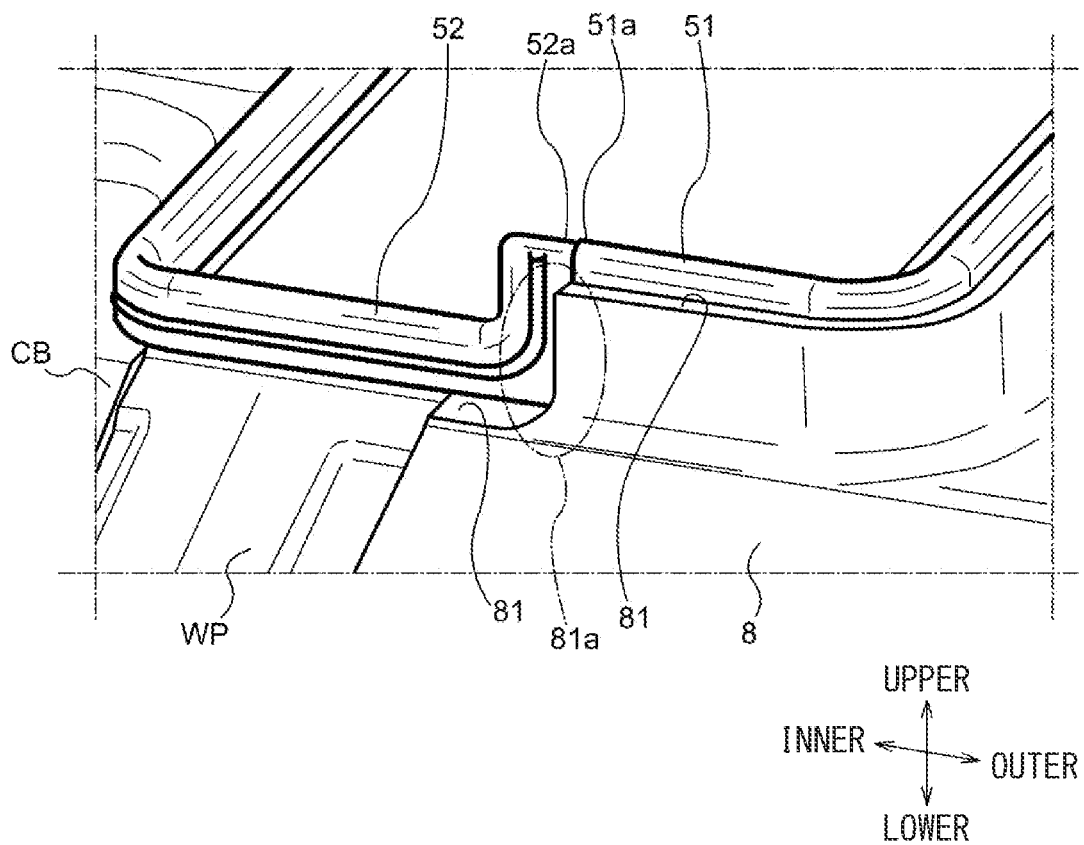
FIG. 8 is a perspective view for explaining the arrangement of seal members on an upper side of the side mount bracket.
Figure 9:
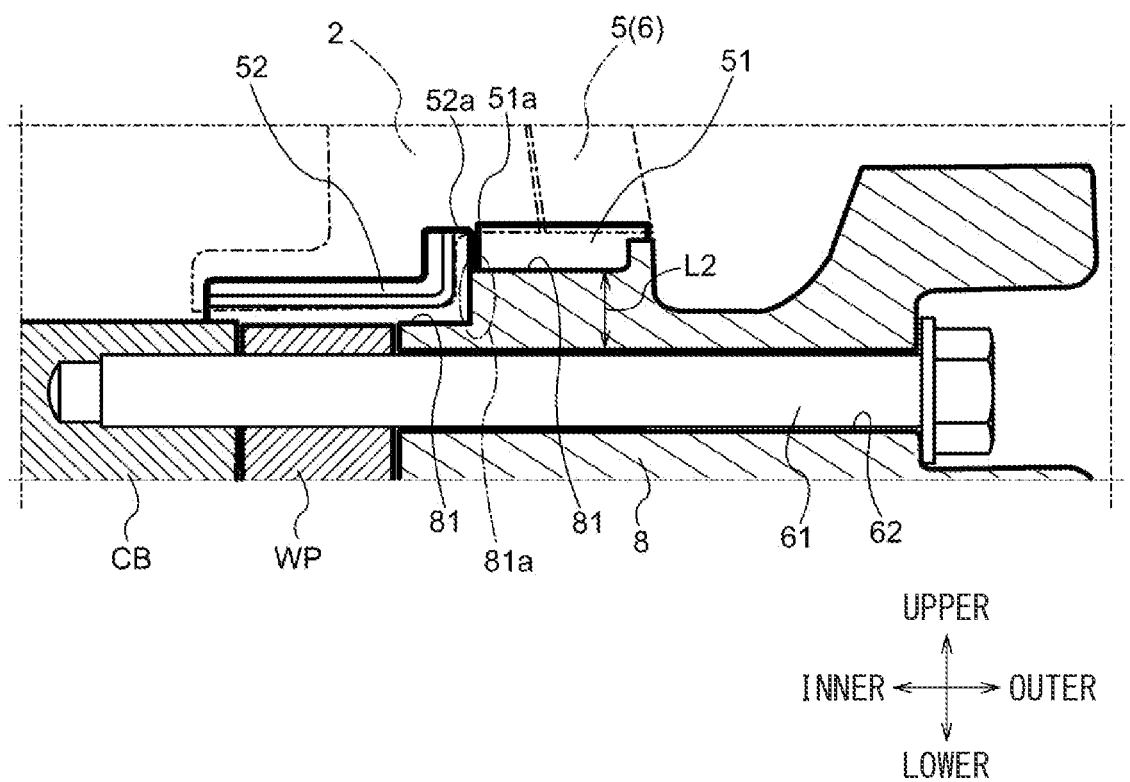
FIG. 9 is a cross-sectional view for explaining a sealing configuration and a fastening configuration on the upper side of the side mount bracket 8.

A sealing configuration on the upper side of the side mount bracket 8 will be described with reference to FIGS. 8 and 9. FIG. 8 is a perspective view for explaining the arrangement of the seal members 51 and 52 on the upper side of the side mount bracket 8. FIG. 9 is a cross-sectional view for explaining the sealing configuration and a fastening configuration on the upper side of the side mount bracket 8. Although only the configuration on the upper side on the front side will be described as in the above description, the configuration on the upper side on the rear side is similar.

As illustrated in FIGS. 8 and 9, the first upper seal member 51 and a part of the second upper seal member 52 are disposed on a mating surface 81 at the upper end portion of the side mount bracket 8. A depressed groove in which the first upper seal member 51 and a part of the second upper seal member 52 are fitted is formed in the mating surface 81. The first upper seal member 51 is a member that forms a seal between the front outer cover 6 and the side mount bracket 8, and the second upper seal member 52 is a member that forms a seal between the front inner cover 2 and both the water pump case WP and an inner end portion of the side mount bracket 8. The first upper seal member 51 and the second upper seal member 52 are including elastic members.

An end portion 51a of the first upper seal member 51 and an end portion 52a of the second upper seal member 52 are disposed so as to be in pressure contact with each other. Specifically, the second upper seal member 52 is configured to rise upward from a position lower than the height of the first upper seal member 51 along a step shape 81a formed on the mating surface 81 on the upper side of the side mount bracket 8. The step shape 81a is configured such that the position where the first upper seal member 51 is disposed is higher than the position where the second upper seal member 52 is disposed in the area where the step is formed. As a result, the end portion 51a of the first upper seal member 51 comes into contact with the end portion 52a of the second upper seal member 52. In addition, tight fixation is performed with a fastening bolt 61 in a direction (front-rear direction) in which the end portion 51a of the first upper seal member 51 and the end portion 52a of the second upper seal member 52 come into contact with each other. The end portion 51a of the first upper seal member 51 is pressed against the end portion 52a of the second upper seal member 52 by the fastening force of the fastening bolt 61, resulting in pressure contact between the end portion 51a of the first upper seal member 51 and the end portion 52a of the second upper seal member 52.

As illustrated in FIG. 9, a bolt boss portion 62 through which the fastening bolt 61 is inserted is formed continuously through the side mount bracket 8, the water pump case WP, and the cylinder block CB. The mating surface 81 of the side mount bracket 8 is formed at the upper end portion in the vicinity of the bolt boss portion 62 and across the front inner cover 2 and the front outer cover 6. As a result, the end portion 51a of the first upper seal member 51 that seals the front outer cover 6 and the end portion 52a of the second upper seal member 52 that seals the front inner cover 2 are adjacent to each other.

Further, since the mating surface 81 is formed in the vicinity of the bolt boss portion 62, in the step shape 81a formed on the mating surface 81, the position where the first upper seal member 51 is disposed is higher than the position where the second upper seal member 52 is disposed. Here, the bolt boss portion 62 through which the fastening bolt 61 is inserted is formed below the position of the step shape 81*a*, so that the length L2 from the bolt boss portion 62 to the upper end of the side mount bracket 8 can be longer than the length from the bolt boss portion 62 to the water pump case WP. Since the fastening bolt 61 is inserted from the side mount bracket 8, rigidity of the side mount bracket 8 at a fastening portion can be ensured.

As described above, according to the present embodiment, the mating surface 86*c* of the side mount bracket 8 is configured to cover the mating surface 96*c* of the lower cover 9 from the outside, and the side mount bracket 8 and the lower cover 9 adjacent to each other in the vertical direction are fixed in a direction intersecting the vertical direction. Accordingly, when the side mount bracket 8 is detached from the lower cover 9, the side mount bracket 8 can be detached in the direction intersecting the vertical direction. In this case, even when it is difficult to detach the side mount bracket 8 in the upward direction due to another cover (front outer cover 6 and rear outer cover 7) disposed above the side mount bracket 8, the side mount bracket 8 can be easily detached. In addition, the lower cover 9 and the side mount bracket 8 are fixed in a state of being pressed against each other via the lower seal member 41. Therefore, it is possible to provide a belt cover of an internal combustion engine 1 having ease of attachment and detachment and sealability.

Further, according to the present embodiment, in the configuration where the side mount bracket 8 is moved to the rear side at the time of attachment and is moved to the front side at the time of detachment, the end portion 8*b* on the rear side of the side mount bracket 8 is fixed to the outer surface 37 of the water pump case WP. This results in a reduction in the amount of movement in the axial direction of the rear end portion 8*b* of the side mount bracket 8 when the side mount bracket 8 is attached and detached, compared to a case where the rear end portion 8*b* covers the water pump case WP like the front end portion 8*a*. Therefore, the ease of attachment and detachment of the side mount bracket 8 can be enhanced.

Further, according to the present embodiment, the first upper seal member 51 that forms a seal between the front outer cover 6 and the side mount bracket 8 and the second upper seal member 52 that forms a seal between the front inner cover 2 and the side mount bracket 8 are disposed so as to be in pressure contact with each other at their end portions 51*a* and 52*a*. This makes it possible to ensure sealability between the first upper seal member 51 and the second upper seal member 52. In addition, the side mount bracket 8 is configured to cover the water pump case WP. Thus, at the time of maintenance of the water pump, detaching the side mount bracket 8 allows for the maintenance without detaching the lower cover 9, and thus attachment and detachment are easy. Therefore, it is possible to provide a belt cover of an internal combustion engine 1 having ease of attachment and detachment and sealability.

Further, according to the present embodiment, the step shape 81*a* is formed on the mating surface 81 of the side mount bracket 8 such that the end portion 51*a* of the first upper seal member 51 and the end portion 52*a* of the second upper seal member 52 are brought into pressure contact with each other by the fastening force of the fastening bolt 61. Accordingly, the first upper seal member 51 and the second upper seal member 52 are brought into pressure contact with each other by inserting the fastening bolt 61 through the bolt boss portion 62 and tightening it, and therefore sealability can be ensured.

Note that the present invention is not limited to the embodiments that have been described, and can be implemented in various aspects. In the above embodiments, the timing belt TB is used as a transmission band for drive transmission from the crankshaft 10 to the camshafts 11, 12, 13, and 14, but the present invention is not limited thereto. For example, as an example of the transmission structure of the internal combustion engine 1, a chain transmission mechanism configured by wrapping a transmission band including a timing chain around a crankshaft drive wheel and a camshaft driven wheel including sprockets may be used.

REFERENCE SIGNS LIST

1 Internal combustion engine
2 Front inner cover (upper inner cover member)
6 Front outer cover (outer cover member, upper outer cover member)
8 Side mount bracket
8*a*, 8*b* End portion
9 Lower cover (outer cover member, lower outer cover member)
41 Lower seal member
51 First upper seal member (first seal member)
52 Second upper seal member (second seal member)
51*a*, 52*a* End portion
61 Fastening bolt
62 Bolt boss portion
81 Mating surface
81*a* Step shape
86*c* Mating surface
96*c* Mating surface
CB Cylinder block (internal combustion engine body)
OP Oil pump case (inner cover member)
TB Timing belt
WP Water pump case

The invention claimed is:
1. A belt cover structure for an internal combustion engine that is disposed on one side surface of an internal combustion engine body and houses at least a part of a timing belt that transmits power between a crankshaft and a camshaft, the belt cover structure comprising:
  an inner cover member that covers the timing belt on a side closer to the internal combustion engine than the timing belt; and
  an outer cover member that covers the timing belt on a side farther from the internal combustion engine than the timing belt,
  the outer cover member including at least a lower outer cover member that covers a periphery of the crankshaft, wherein
  the internal combustion engine body holds a side mount bracket that is disposed adjacent to an upper side of the lower outer cover member,
  mating surfaces that are aligned with each other are respectively formed on the lower outer cover member and the side mount bracket,
  a lower seal member that seals the lower outer cover member and the side mount bracket is disposed on the mating surface of the lower outer cover member,
  the mating surface of the side mount bracket is configured to cover the mating surface of the lower outer cover member from an outside, and
  the lower outer cover member and the side mount bracket are fixed in a state where the mating surface of the side mount bracket is pressed against the mating surface of the lower outer cover member via the lower seal member, a water pump case is disposed on the one side surface of the internal combustion engine body, the side mount bracket has an end portion on one side in a width direction that is a direction perpendicular to an axial direction of the crankshaft, the end portion on the one side being configured to cover the water pump case, and has an end portion on another side in the width direction, the end portion on the other side being configured to be fixed to an outer surface of the water pump case, and the side mount bracket is configured to be moved to the other side when the side mount bracket is attached and the side mount bracket is configured to be moved to the one side when the side mount bracket is detached.

2. A belt cover structure for an internal combustion engine that is disposed on one side surface of an internal combustion engine body and houses at least a part of a timing belt that transmits power between a crankshaft and a camshaft, the belt cover structure comprising:

an inner cover member that covers the timing belt on a side closer to the internal combustion engine than the timing belt; and an outer cover member that covers the timing belt on a side farther from the internal combustion engine than the timing belt, the inner cover member including at least an upper inner cover member that covers a periphery of the camshaft, the outer cover member including at least an upper outer cover member that covers a periphery of the camshaft, wherein a water pump case is disposed on the one side surface of the internal combustion engine body so as to be adjacent to a lower side of the upper inner cover member, a side mount bracket that covers the water pump case on a side farther from the internal combustion engine than the water pump case is disposed, the upper outer cover member is fixed to an upper side of the side mount bracket via a first seal member provided on the side mount bracket, the upper inner cover member is fixed to an upper side of the side mount bracket and an upper side of the water pump case via a second seal member provided on the side mount bracket, and an end portion of the first seal member and an end portion of the second seal member are disposed so as to be in pressure contact with each other.

3. The belt cover structure for an internal combustion engine according to claim 2, wherein a bolt boss portion through which a fastening bolt is inserted is formed continuously through the side mount bracket and the water pump case, the side mount bracket has a mating surface that is aligned with both the upper inner cover member and the upper outer cover member near the bolt boss portion, and a step shape is formed on the mating surface such that the end portion of the first seal member and the end portion of the second seal member are brought into pressure contact with each other by a fastening force of the fastening bolt.

* * * * *